Patented Oct. 25, 1932

1,884,123

UNITED STATES PATENT OFFICE

PAUL I. MURRILL, OF EAST NORWALK, CONNECTICUT, ASSIGNOR TO R. T. VANDERBILT COMPANY, INCORPORATED, OF NEW YORK, N. Y., A CORPORATION OF NEW YORK

ART OF VULCANIZING RUBBER

No Drawing.   Application filed April 1, 1930. Serial No. 440,858.

This invention relates to the vulcanization of rubber and includes the new vulcanization process as well as the new vulcanization products.

According to the present invention, the vulcanization is carried out with the addition to the rubber of organic tellurium compounds containing the group —CSS—, these tellurium compounds being active both as vulcanizing agents and as accelerators of vulcanization.

The new organic tellurium compounds used in the process of the present invention and in making the new vulcanized products of the invention have the following general formula: $(-CSS)_4Te$, and they may contain nitrogen, oxygen or carbon joined to the carbon of the above formula. Among the new vulcanizing agents which are particularly valuable for use in carrying out the invention, are the tellurium salts or compounds of diethyl- and dimethyldithiocarbamic acid of the general formula: $(RR'N.CSS)_4Te$, where R and R' represent simple or substituted hydrocarbon radicals, which may be the same or different radicals such as methyl, ethyl, phenyl, benzyl, etc., or where $RR'N$ represents piperidyl, etc. Similar tellurium compounds can be derived from the xanthic acids of the general formula $(RO.CSS)_4Te$, and from dithioacetic, dithiobenzoic, etc., acids of the general formula $\equiv C.CSS)\ Te$. The new tellurium compounds can be produced in accordance with the process more fully described in my companion application Serial No. 440,860, filed of even date by the action of a soluble tellurite such as sodium tellurite upon the sodium salt of the dithio acid, with the addition of a non-oxidizing mineral or organic acid such as hydrochloric acid. The tellurium diethyl- and dimethyldithiocarbamates may be produced, for example, by the reaction of the sodium diethyl- or dimethyldithiocarbamate (4 mols.) upon sodium tellurite (1 mol.) and hydrochloric acid (6 mols.). The unpurified product prepared in this manner has a melting point of about 121–122° C. On recrystallization from alcohol or benzol it forms a bulky orange-yellow precipitate with a melting point of 123–124° C. The impure product may be used in the vulcanization process of this invention.

In using the new compounds in the vulcanization of rubber they may be used as vulcanizing agents without the addition of sulfur or other sulfur-containing compound. They may be compounded with the rubber mix in the usual way. About 2 to 3% by weight of the rubber gives satisfactory results. The following specific examples, in which tellurium diethyldithiocarbamate is used as the vulcanizing agent, further illustrate the invention.

| Formula: | #1 | #2 |
|---|---|---|
| Smoked sheets | 100 | 100 |
| Zinc oxide | 5 | 5 |
| Stearic acid | -- | 2 |
| $(Et_2N.CSS)_4Te$ | 3 | 3 |

Each sample was cured at 40 lbs. pressure (141° C.) for the time indicated.

| Formula: | #1 | | | #2 | | |
|---|---|---|---|---|---|---|
| Time | (a) | (b) | (c) | (a) | (b) | (c) |
| 15 min | 75 | 730 | 985 | 100 | 810 | 910 |
| 30 min | 155 | 1520 | 845 | 210 | 1720 | 780 |
| 45 min | 195 | 1950 | 820 | 260 | 1880 | 750 |
| 60 min | 230 | 2280 | 815 | 280 | 1980 | 740 |
| 10 hrs | | | | 260 | 1950 | 750 |

The letters (a), (b), and (c) denote:
(a) Tensile strength at 500% elongation.
(b) Tensile strength at the break.
(c) Elongation at the break.

The new vulcanized products have improved properties and are characterized by containing tellurium as well as sulfur therein together with products of the reaction of the organic tellurium compounds.

I claim:
1. The method of vulcanizing rubber which comprises subjecting the rubber to vulcanization with the addition thereto of an organic tellurium compound containing the following group: —CSS—.
2. The method of vulcanizing rubber which comprises subjecting the rubber to vulcanization with the addition thereto of an organic tellurium compound of the following general composition: $Te(SSC-)_4$.

3. The method of vulcanizing rubber which comprises subjecting the rubber to vulcanization with the addition thereto of an organic tellurium compound of the following general formula: $(RR'NCSS)_4Te$, where R and R' are hydrocarbon radicals.

4. The method of vulcanizing rubber which comprises subjecting the rubber to vulcanization with the addition thereto of an organic tellurium compound of the following general formula: $(RO.CSS)_4Te$, in which R is a hydrocarbon radical.

5. The method of vulcanizing rubber which comprises subjecting the rubber to vulcanization with the addition thereto of an organic tellurium compound of the following general formula: $(\equiv C.CSS)_4Te$.

6. The method of vulcanizing rubber which comprises subjecting the rubber to vulcanization in the presence of tellurium diethyldithiocarbamate.

7. The method of vulcanizing rubber which comprises subjecting the rubber to vulcanization in the presence of tellurium dialkyldithiocarbamate.

8. The method of vulcanizing rubber which comprises subjecting the rubber to vulcanization with the addition thereto of an organic tellurium compound containing the following group: —CSS— as the vulcanizing agent without the addition of sulfur.

9. The method of vulcanizing rubber which comprises subjecting the rubber to vulcanization with the addition thereto of an organic tellurium compound of the following general composition: $Te(SSC—)_4$ as the vulcanizing agent without the addition of sulfur.

10. The method of vulcanizing rubber which comprises subjecting the rubber to vulcanization with the addition thereto of an organic tellurium compound of the following general formula: $(RR'NCSS)_4Te$, where R and R' are hydrocarbon radicals, as the vulcanizing agent without the addition of sulfur.

11. The method of vulcanizing rubber which comprises subjecting the rubber to vulcanization with the addition thereto of an organic tellurium compound of the following general formula: $(RO.CSS)_4Te$, in which R is a hydrocarbon radical, as the vulcanizing agent without the addition of sulfur.

12. The method of vulcanizing rubber which comprises subjecting the rubber to vulcanization with the addition thereto of an organic tellurium compound of the following general formula: $(\equiv C.CSS)_4Te$, as the vulcanizing agent without the addition of sulfur.

13. The method of vulcanizing rubber which comprises subjecting the rubber to vulcanization in the presence of tellurium diethyldithiocarbamate as the vulcanizing agent without the addition of sulfur.

14. The method of vulcanizing rubber which comprises subjecting the rubber to vulcanization in the presence of tellurium dialkyldithiocarbamate as the vulcanizing agent without the addition of sulfur.

15. New vulcanized rubber products characterized by the addition thereto before vulcanization of an organic tellurium compound containing the following group: —CSS—.

16. New vulcanized rubber products characterized by the addition thereto before vulcanization of an organic tellurium compound of the following general composition: $Te(SSC—)_4$.

17. New vulcanized rubber products characterized by the addition thereto before vulcanization of an organic tellurium compound of the following general formula: $(RR'NCSS)_4Te$, where R and R' are hydrocarbon radicals.

18. New vulcanized rubber products characterized by the addition thereto before vulcanization of an organic tellurium compound of the following general formula: $(RO.CSS)_4Te$, in which R is a hydrocarbon radical.

19. New vulcanized rubber products characterized by the addition thereto before vulcanization of an organic tellurium compound of the following general formula: $(\equiv C.CSS)_4Te$.

20. New vulcanized rubber products characterized by the addition thereto before vulcanization of tellurium diethyldithiocarbamate.

21. New vulcanized rubber products characterized by the addition thereto before vulcanization of tellurium dialkyldithiocarbamate.

In testimony whereof I affix my signature.

PAUL I. MURRILL.